US012746504B2

(12) United States Patent
Inaba et al.

(10) Patent No.: US 12,746,504 B2
(45) Date of Patent: Sep. 29, 2026

(54) CARBON DIOXIDE REMOVAL APPARATUS

(71) Applicant: HONDA MOTOR CO., LTD., Tokyo (JP)

(72) Inventors: Toshiyuki Inaba, Saitama (JP); Shumon Hoshino, Saitama (JP); Masanobu Takazawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 257 days.

(21) Appl. No.: 18/475,254

(22) Filed: Sep. 27, 2023

(65) Prior Publication Data

US 2024/0109021 A1 Apr. 4, 2024

(30) Foreign Application Priority Data

Sep. 29, 2022 (JP) ................................ 2022-155963

(51) Int. Cl.
*B01D 53/04* (2006.01)

(52) U.S. Cl.
CPC .... *B01D 53/0438* (2013.01); *B01D 2257/504* (2013.01); *B01D 2258/06* (2013.01); *B01D 2259/40098* (2013.01)

(58) Field of Classification Search
CPC .......... B01D 53/0438; B01D 2257/504; B01D 2258/06; B01D 2259/40098; B01D 53/0407; Y02C 20/40
See application file for complete search history.

(56) References Cited

U.S. PATENT DOCUMENTS 4,570,983 A * 2/1986 Olenfalk ............... F16L 41/086 285/212
4,667,482 A * 5/1987 Kriekels ................... F24H 4/04 62/238.7
4,713,939 A * 12/1987 Keith ........................ F25B 9/14 60/520
4,756,876 A * 7/1988 Dagard .................. B01D 61/18 976/DIG. 268
5,908,492 A * 6/1999 Lehman ............. B01D 53/0407 96/144
5,918,911 A * 7/1999 Sims .................... G21C 13/036 285/15

(Continued)

FOREIGN PATENT DOCUMENTS

CN 101646868 A 2/2010
CN 208865399 U 5/2019

(Continued)

OTHER PUBLICATIONS

Notification of Reasons for Refusal issued Jun. 25, 2024 in the JP Patent Application No. 2022-155963.

(Continued)

*Primary Examiner* — Stephen Hobson
(74) *Attorney, Agent, or Firm* — CKC & Partners Co., LLC

(57) ABSTRACT

Provided is a carbon dioxide removal apparatus capable of reducing heat loss that can be caused when carbon dioxide is desorbed from an adsorbent. The carbon dioxide removal apparatus includes a frame, and an adsorption-desorption part supported by the frame. A clearance is provided between the frame and the adsorption-desorption part, and an air guide having flexibility is provided in the clearance.

7 Claims, 6 Drawing Sheets

(56) References Cited

U.S. PATENT DOCUMENTS 5,932,182 A * 8/1999 Blaney ................. B01J 19/0066 203/16
10,675,582 B2 * 6/2020 Meirav .............. B01D 53/0438
12,431,763 B1 * 9/2025 Brew .................. F04D 29/5806
2003/0015093 A1 * 1/2003 Wegeng .................... C01B 3/56 95/114
2005/0249647 A1 * 11/2005 Rogers .................... C01B 3/382 422/504
2007/0095212 A1 * 5/2007 Nowobilski ....... B01D 53/0446 96/152
2007/0181293 A1 * 8/2007 Kato ..................... F28F 9/0224 165/173
2009/0260372 A1 * 10/2009 Skinner .............. B01D 53/0462 62/93
2010/0237615 A1 * 9/2010 Cho .................... F16L 23/0283 285/412
2011/0220317 A1 * 9/2011 Kidwell .................. F24T 10/17 165/287
2015/0328957 A1 * 11/2015 Baek .................. B60H 1/00521 62/515
2016/0325223 A1 * 11/2016 Büchner .................. B63G 8/36
2017/0106330 A1 * 4/2017 Gebald .............. B01D 53/0423
2017/0113176 A1 * 4/2017 Fowler ............... B01D 53/0473
2018/0085704 A1 * 3/2018 Dubois ................... C08L 27/16
2018/0094560 A1 * 4/2018 Williams .................. F01N 3/04
2018/0236396 A1 * 8/2018 Meirav ..................... F24F 7/08
2019/0022574 A1 * 1/2019 Jin ......................... B01D 53/06
2019/0041072 A1 * 2/2019 Okano ................... B01D 53/04
2019/0160418 A1 * 5/2019 Matsumoto .......... B01D 53/261
2019/0232355 A1 * 8/2019 Ha ........................ F16L 23/024
2019/0255480 A1 * 8/2019 Wurzbacher ....... B01D 53/0462
2019/0282950 A1 * 9/2019 Naito ...................... B01D 53/62
2020/0171925 A1 * 6/2020 Matsumoto ........ B01D 53/0407
2020/0224789 A1 * 7/2020 Feuster .................. A62C 35/68
2021/0039036 A1 * 2/2021 Okano ................... B01D 53/06
2021/0116162 A1 * 4/2021 Picanco ................ F25D 31/005
2021/0140655 A1 * 5/2021 Meirav ...................... F24F 8/30
2021/0148586 A1 * 5/2021 Hall .......................... F24D 3/14
2021/0252451 A1 * 8/2021 Zhong ..................... F24F 8/158
2023/0258112 A1 * 8/2023 Uto ........................ F01N 3/0857 96/126
2024/0100467 A1 * 3/2024 Inaba ................. B01D 53/0446

FOREIGN PATENT DOCUMENTS

| | | | | |
|---|---|---|---|---|
| CN | 213192953 U | | 5/2021 | |
| CN | 110030654 B | * | 9/2021 | .............. F24F 8/125 |
| CN | 113457369 A | | 10/2021 | |
| CN | 216572338 U | | 5/2022 | |
| CN | 114849427 A | | 8/2022 | |
| JP | H08266850 A | | 10/1996 | |
| JP | 3045066 U | | 1/1998 | |
| JP | 2000140554 A | | 5/2000 | |
| JP | 2013202504 A | | 10/2013 | |
| JP | 2020082038 A | | 6/2020 | |
| WO | 2008115615 A1 | | 9/2008 | |
| WO | WO-2024122499 A1 | * | 6/2024 | ............. B01D 53/04 |

OTHER PUBLICATIONS

Office Action issued Jun. 27, 2026 in the CN Patent Application No. 202311224127.7.

* cited by examiner

CARBON DIOXIDE REMOVAL APPARATUS

CROSS REFERENCE TO RELATED APPLICATIONS

This application claims the benefit of priority to Japanese Patent Application No. 2022-155963 filed on Sep. 29, 2022. The entire contents of this application are hereby incorporated herein by reference.

BACKGROUND OF THE INVENTION

Field of the Invention

The present invention relates to a carbon dioxide removal apparatus.

Related Art

Efforts to mitigate climate change and reduce the effects of climate change are ongoing, and research and development to reduce carbon dioxide emissions are underway to achieve this goal. Some techniques have been proposed as the approaches to attain the goal. For example, according one proposed technique, carbon dioxide in the atmosphere is captured to be stored in the form of gas or liquid in the ground or the like. According to another proposed technique, captured carbon dioxide is used as a carbon source, and carbon is converted into valuable substances such as fuels and chemical products.

In particular, with respect to carbon dioxide capture by direct air capture (DAC), it has been proposed to capture carbon dioxide by adsorption. For example, U.S. Published Patent Application Publication, No. 2019/0255480 discloses a technique in which an adsorbent for adsorbing carbon dioxide is disposed in a plurality of layers on an adsorbent holding member.

Patent Document 1: U.S. Published Patent Application Publication, No. 2019/0255480

SUMMARY OF THE INVENTION

Incidentally, in a process for reducing carbon dioxide emissions by DAC, an adsorbent having carbon dioxide adsorbed thereon is heated whereby the carbon dioxide is desorbed from the adsorbent. In a case where the adsorbent is held on an adsorbent holding member, the adsorbent holding member is heated to heat the adsorbent. At this time, if the adsorbent holding member is fixed directly to a support member such as a frame, there is a disadvantage that heat is transferred from the adsorbent holding member to the frame or the like to cause heat loss. In view of the foregoing circumstances, it is an object of the present invention to provide a carbon dioxide removal apparatus capable of reducing heat loss that is caused when carbon dioxide is desorbed from an adsorbent.

Furthermore, the present invention contributes to mitigating climate change and reducing the effects of climate change.

A first aspect of the present invention is directed to a carbon dioxide removal apparatus including: a frame; and an adsorption-desorption part supported by the frame. A clearance is provided between the frame and the adsorption-desorption part, and an air guide having flexibility is provided adjacent to the clearance.

The carbon dioxide removal apparatus according to the above aspect is capable of reducing heat loss that is caused when carbon dioxide is desorbed from an adsorbent. This is because the clearance between the frame and the adsorption-desorption part inhibits heat from being transferred directly from the adsorption-desorption part to the frame.

Furthermore, the air guide causes a larger amount of air to pass through the adsorption-desorption part. This makes it possible to adsorb carbon dioxide with enhanced efficiency.

In the carbon dioxide removal apparatus according to a second aspect, it is preferable that the adsorption-desorption part is partially fixed to the frame via a heat insulating holding member.

The carbon dioxide removal apparatus according to the above aspect makes it easy to stably fix the adsorption-desorption part to the frame, while reducing heat transfer from the adsorption-desorption part to the frame via the holding member.

In the carbon dioxide removal apparatus according to a third aspect, it is preferable that the adsorption-desorption part includes a heat exchanger, the heat exchanger includes a refrigerant inlet and a refrigerant outlet, the frame has a through hole formed therein, the refrigerant inlet or the refrigerant outlet is disposed in the through hole, a pipe flange is interposed between an inner wall of the through hole and the refrigerant inlet or the refrigerant outlet, and a heat insulator is interposed between the pipe flange and the refrigerant inlet or the refrigerant outlet.

The carbon dioxide removal apparatus according to the above aspect makes it possible to further stably fix the adsorption-desorption part to the frame by way of the refrigerant inlet or the refrigerant outlet, while reducing heat transfer from the adsorption-desorption part to the frame via the pipe flange.

In the carbon dioxide removal apparatus according to a fourth aspect, it is preferable that a heat insulator is disposed in at least part of a portion between the frame and the pipe flange.

The carbon dioxide removal apparatus according to the above aspect makes it possible to firmly fix the pipe flange to the frame, while reducing heat transfer between the pipe flange and the frame.

In the carbon dioxide removal apparatus according to a fifth aspect, it is preferable that a gap is provided between the frame and the pipe flange in the through hole, the pipe flange has a mounting hole via which the pipe flange is fixed to the frame, and the mounting hole has the shape of a long hole or an enlarged hole.

The carbon dioxide removal apparatus according to the above aspect makes it easy to fix the adsorption-desorption part to the frame, while tolerating positional displacement of the adsorption-desorption part.

In the carbon dioxide removal apparatus according to a sixth aspect, it is preferable that in a state in which an inside of the frame is decompressed, a degree of contact increases between the air guide and the adsorption-desorption part.

The carbon dioxide removal apparatus according to the above aspect has a configuration in which the air guide comes into close contact with the adsorption-desorption part only when the pressure is low. As a result, heat damage to the air guide can be reduced.

It should be noted that the first to sixth aspects described above may be combined as appropriate.

The present invention provides a carbon dioxide removal apparatus capable of reducing heat loss that is caused when carbon dioxide is desorbed from an adsorbent.

DETAILED DESCRIPTION OF THE INVENTION

Outline of Carbon Dioxide Removal Apparatus

Figure 1:
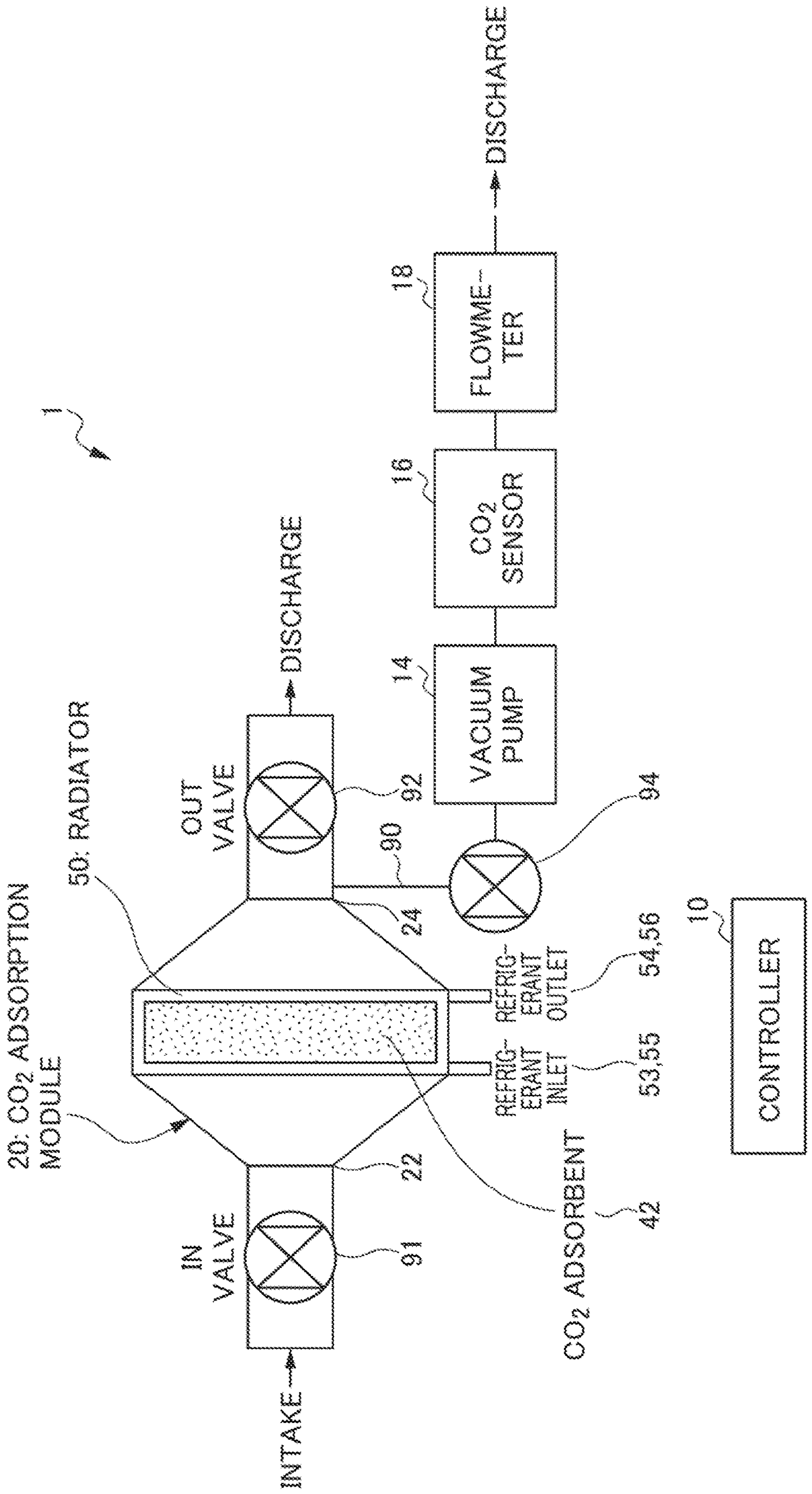
FIG. 1 is a diagram schematically illustrating a configuration of a carbon dioxide removal apparatus of the present invention.

An example of embodiments of the carbon dioxide removal apparatus 1 of the present invention will be described with reference to the drawings. FIG. 1 is a diagram schematically illustrating a configuration of the carbon dioxide removal apparatus 1 according to the present embodiment. In the following description, a flow of gas from "INTAKE" to "DISCHARGE" shown in FIG. 1 is defined as a flow from an upstream side to a downstream side. The carbon dioxide removal apparatus 1 includes a carbon dioxide adsorption module 20, a path into which gas from the carbon dioxide adsorption module 20 is directly discharged, and a path into which gas from the carbon dioxide adsorption module 20 is discharged via a vacuum pump 14, a carbon dioxide sensor 16, and a flowmeter 18. The path for the direct discharge is for use in an adsorption step to be described later. The path for the discharge via the vacuum pump 14 is for use in a desorption step to be described later. The carbon dioxide adsorption module 20 is provided with an adsorbent 42 and a radiator 50 as a heat exchanger. The foregoing components are connected to each other with a pipe 90 and the like.

Specifically, an intake part 22 is provided in an upstream portion of the carbon dioxide adsorption module 20. A discharge part 24 is provided in a downstream portion of the carbon dioxide adsorption module 20. A first valve 91 is provided upstream of the intake part 22. A second valve 92 is provided downstream of the discharge part 24. A branch is provided between the discharge part 24 and the second valve 92. The pipe 90 extends from the branch and is provided with a third valve 94, the vacuum pump 14, the carbon dioxide sensor 16, and the flowmeter 18 in this order in the upstream-to-downstream direction. As can be seen, the discharge line from the discharge part 24 branches off into a first discharge line on which the second valve 92 is disposed and a second discharge line on which the third valve 94 is disposed. That is, the third valve 94 is disposed in parallel with the second valve 92.

Controller

The carbon dioxide removal apparatus 1 is provided with a controller 10. The controller 10 controls the operation of each component, acquires information from each component, and performs other functions. For example, the controller 10 controls the operation of the pump, and opening and closing of the valves. Moreover, the controller 10 acquires measurement values acquired by the sensor, the meter, and the like.

Outline of Carbon Dioxide Removal

An outline of carbon dioxide removal performed by the carbon dioxide removal apparatus 1 will be described. The carbon dioxide removal apparatus 1 collects carbon dioxide from air by allowing the adsorbent to adsorb carbon dioxide (adsorption step). After the collection, adsorbed carbon dioxide is desorbed from the adsorbent (desorption step). The desorbed carbon dioxide is compressed to be stored in a cylinder, thereby removing carbon dioxide from air. This process will be specifically described in the following.

Adsorption Step

In the adsorption step, the first valve 91 and the second valve 92 are opened, and the third valve 94 is closed. Air is taken in using a vacuum pump (not shown), a fan (not shown), or the like, and caused to pass through the carbon dioxide adsorption module 20. The carbon dioxide adsorption module 20 is provided with the adsorbent 42. Carbon dioxide in the air is adsorbed on the adsorbent 42 when the air passes through the carbon dioxide adsorption module 20.

(Desorption Step)

In the desorption step, the carbon dioxide adsorbed on the adsorbent 42 in the adsorption step is desorbed from the adsorbent 42. At this time, the first valve 91 and the second valve 92 are closed, and the third valve 94 is opened. Then, the vacuum pump 14 is driven to reduce the pressure inside a frame 30. Furthermore, the carbon dioxide adsorption module 20 is heated by a heating device such as the radiator 50. Consequently, carbon dioxide is desorbed from the adsorbent 42 and flows toward the downstream side. The desorbed carbon dioxide flows through the carbon dioxide sensor 16 and the flowmeter 18. Thus, an amount of the desorbed carbon dioxide can be grasped.

The desorbed carbon dioxide is compressed by a compressor (not shown) or the like and filled into a cylinder or the like. The cylinder or the like filled with the carbon dioxide is buried in the ground, for example. Thus, the removal of carbon dioxide from the air by the carbon dioxide removal apparatus 1 is completed.

Carbon Dioxide Adsorption Module

Figure 2:
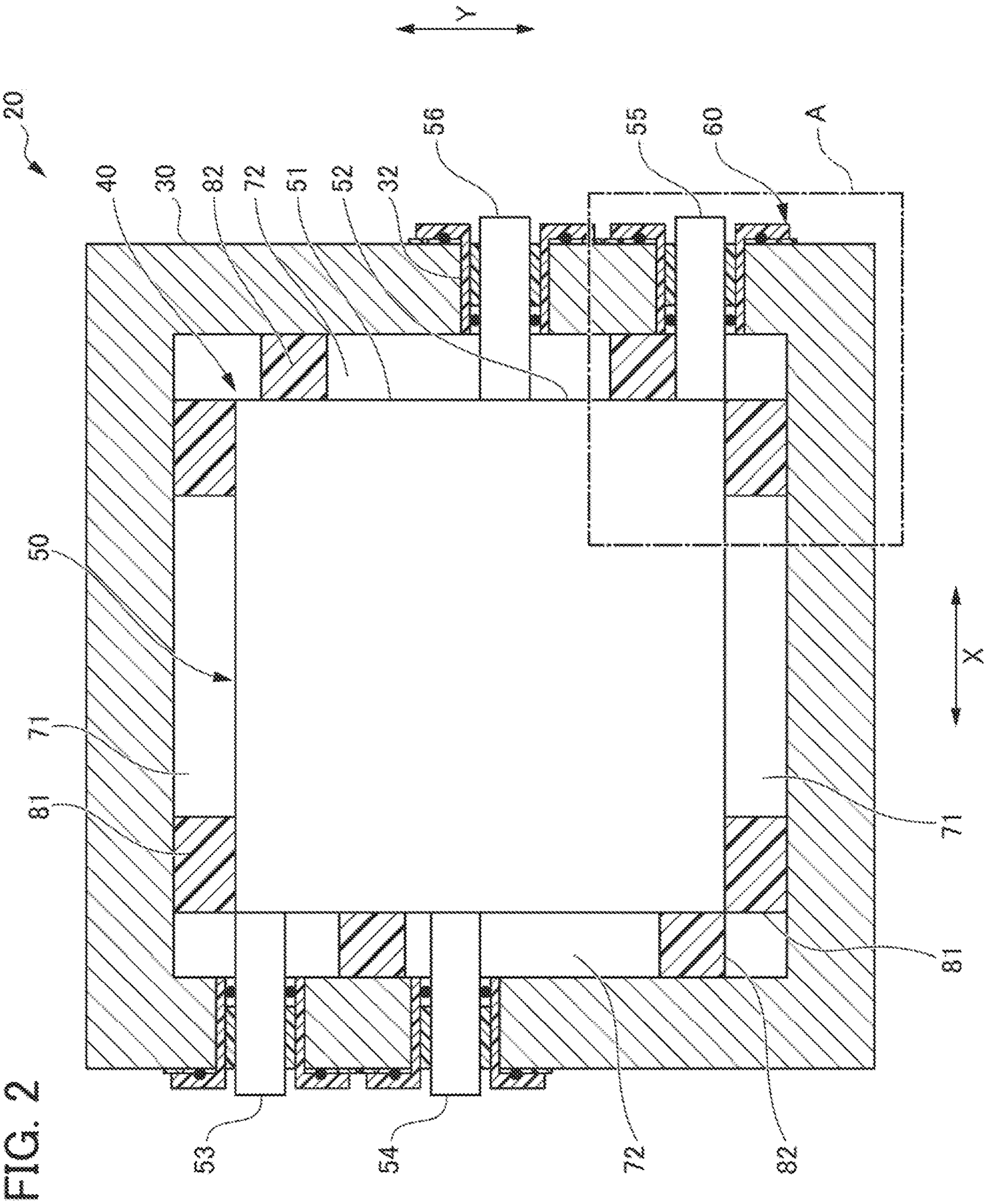
FIG. 2 is a diagram schematically illustrating a configuration of a carbon dioxide adsorption module of the present invention.

The carbon dioxide adsorption module 20 will be specifically described with reference to FIG. 2 and other figures. FIG. 2 is a cross-sectional view of the carbon dioxide adsorption module 20 of the present embodiment and illustrates an outline of the carbon dioxide adsorption module 20. In FIG. 2 and FIGS. 3 to 6 to be described later, the X direction, the Y direction, and the Z direction are indicated. These directions are orthogonal to each other. The X direction is defined as a lateral width direction, the Y direction is defined as a height direction, and the Z direction is defined as a depth direction.

Frame

The carbon dioxide adsorption module 20 includes a frame 30 and an adsorption-desorption part 40. The adsorption-desorption part 40 is accommodated in and held by the frame 30. The frame 30 functions as a frame body or a housing for the adsorption-desorption part 40. The frame 30 may be configured as, for example, a rectangular parallelepiped box.

Adsorption-Desorption Part and Heat Exchanger

The adsorption-desorption part 40 includes a heat exchanger 50 and the adsorbent 42. The heat exchanger 50 is a device that allows a refrigerant or a fluid serving as a heat source to flow therethrough and exchanges heat to thereby adjust a temperature of the surroundings. In the present embodiment, a radiator is used as the heat exchanger 50. Hereinafter, the heat exchanger will be referred to as the radiator 50.

Adsorbent

The adsorbent 42 is filled between fins 58 of the radiator 50. In the present embodiment, the radiator 50 functions as not only a heat exchanger but also an adsorbent holding member. This will be described later with reference to FIG. 3.

Clearances

Clearances are provided between the frame 30 and the adsorption-desorption part 40. Specifically, the clearances are provided between the frame 30 and the radiator 50 of the adsorption-desorption part 40. In FIG. 2, the clearances extending in the lateral width direction X are each denoted as a first clearance 71, and the clearances extending in the height direction Y are each denoted as a second clearance 72. In the example illustrated in FIG. 2, the radiator 50 has a quadrangular cross-sectional shape. The clearances are provided between the frame 30 and all the four sides of the radiator 50, and accordingly, are arranged around the radiator 50. Specifically, the first clearances 71 are provided on the upper side and the lower side in the height direction Y of the radiator 50. The second clearances 72 are provided on both sides in the lateral width direction X of the radiator 50.

It should be noted that the clearances do not have to be provided on all the four sides around the radiator 50, and may be provided on some of the four sides. For example, only the first clearances 71 extending in the lateral width direction X may be provided. Likewise, only the second clearances 72 extending in the height direction Y may be provided. Furthermore, the first clearance 71 may be provided only on one of the upper and lower sides of the radiator 50. Likewise, the second clearance 72 may be provided only on one of the two lateral sides of the radiator 50. However, it is preferable that the clearances are provided on at least two sides among the four sides around the radiator 50. For example, in a case where the outline shape of the adsorption-desorption part 40 including the radiator 50 appears to be substantially quadrangular when viewed in a direction of an airflow from the intake part 22 to the discharge part 24, it is preferable that the clearances are provided on at least two opposite ones of the sides of the adsorption-desorption part 40. For example, the clearances may be provided on the upper and lower sides in the height direction Y, or on both lateral sides in the lateral width direction X. More preferably, the clearances are provided on all the four sides around the adsorption-desorption part 40. That is, it is preferable that the clearances are provided over the entire periphery of the adsorption-desorption part 40. This configuration makes it possible to more effectively reduce the heat loss that is caused by heat transfer from the adsorption-desorption part 40 to the frame 30. The outline shape of the adsorption-desorption part 40 when viewed in the direction of the airflow from the intake portion 22 to the discharge part 24 is not limited to the substantially quadrangular shape.

The clearances between the frame 30 and the radiator 50 inhibit heat from being directly transferred from the radiator 50 to the frame 30. As a result, the heat loss can be reduced when heating is performed during the desorption step.

For example, as described above, to desorb carbon dioxide from the adsorbent 42, the radiator 50 is heated in order to heat the adsorbent 42. In this case, if part of heat is transferred from the radiator 50 to the frame 30, the part will constitute heat loss. This is because the part of heat does not contribute to the heating of the adsorbent 42. In the carbon dioxide adsorption module 20 of the present embodiment, the clearances are provided between the frame 30 and the radiator 50. Therefore, the heat loss due to heat transfer from the radiator 50 to the frame 30 can be deduced.

The clearances between the frame 30 and the radiator 50 allow air layers to be formed between the frame 30 and the radiator 50. This makes it possible to reduce heat radiation from the radiator 50. Furthermore, when the inside of the frame 30 is decompressed and a vacuum is generated therein, the clearances can perform a function of vacuum insulation. As can be seen, the carbon dioxide adsorption module 20 of the present embodiment can reduce, in addition to the heat transfer from the radiator 50 to the frame 30, the heat loss due to heat radiation from the radiator 50.

Holding Members

Heat insulating holding members are arranged in the clearances between the frame 30 and the radiator 50. Specifically, first holding members 81 are arranged in the first clearances 71, and second holding members 82 are arranged in the second clearances 72. The holding members arranged in the clearances between the frame 30 and the radiator 50 can stabilize the radiator 50 in position within the frame 30 while ensuring the clearances. Furthermore, using a heat insulating material as the holding members makes it possible to reduce heat transfer from the radiator 50 to the frame 30 through the holding members. As a result, the radiator 50 can be stabilized in position while the heat loss is reduced.

In the example illustrated in FIG. 2, two first holding members 81 are arranged in one first clearance 71. Likewise, two second holding members 82 are arranged in one second clearance 72. However, the arrangement of the holding members is not limited thereto. The positions at which the holding members are to be arranged and the number of the holding members to be arranged are not particularly limited. An arbitrary number of the holding members may be arranged at arbitrary positions in the clearances. In the example illustrated in FIG. 2, since the plurality of holding members are arranged, the clearances between the frame 30 and the adsorption-desorption part 40 are intermittently provided over the entire periphery of the adsorption-desorption part 40.

The material for forming the holding members is not particularly limited, but is preferably a foam material. In the case of the holding members formed of a foam material, air bubbles contained in the holding members can reduce heat transfer from the radiator 50 to the frame 30 through the holding members. Furthermore, the holding members can be imparted with a shock-absorbing function due to the air bubbles contained in the holding members. As a result, the radiator 50 can be further stabilized in position inside the frame 30.

Among foam materials, a fine foam material is preferred as the material for forming the holding members. As described above, in the desorption step, the inside of the frame 30 is decompressed. In the case where the holding members are formed of a fine foam material containing small air bubbles, deformation of the holding members under a reduced pressure can be suppressed.

The material for forming the holding members is preferably PTFE (polytetrafluoroethylene). That is, it is preferable to form the holding members of foamed PTFE.

Radiator Members

The radiator 50 will now be described. In the present embodiment, the radiator 50 includes two radiator members. One is a first radiator member 51 functioning as a first heat exchanger, and the other is a second radiator member 52 functioning as a second heat exchanger. The first radiator member 51 and the second radiator member 52 are arranged continuously in the height direction Y. The radiator member disposed on the upper side in the height direction Y is the first radiator member 51. The radiator member disposed on the lower side in the height direction Y is the second radiator member 52.

Refrigerant Inlets and Refrigerant Outlets Each of the radiator members includes a refrigerant inlet and a refrigerant outlet. The refrigerant inlet of the first radiator member 51 is referred to as a first refrigerant inlet 53, and the refrigerant outlet of the first radiator member 51 is referred to as a first refrigerant outlet 54. Likewise, the refrigerant inlet of the second radiator member 52 is referred to as a second refrigerant inlet 55, and the refrigerant outlet of the second radiator member 52 is referred to as a second refrigerant outlet 56.

The refrigerant inlets and the refrigerant outlets of the two radiator members are arranged in the following order. The first refrigerant inlet 53, the first refrigerant outlet 54, the second refrigerant outlet 56, and the second refrigerant inlet 55 are arranged in this order from the upper side in the height direction Y. By arranging the refrigerant inlets and the refrigerant outlets in this manner, a temperature difference between the two radiator members can be reduced to a low level in the vicinity of the interface where the two radiator members are in contact with each other, and consequently, a temperature difference in the entire radiator 50 can be reduced to a low level. This is because the refrigerant outlets of the radiator members are adjacent to each other. Reducing the temperature difference between the two radiator members in the vicinity of the interface where the two radiator members are in contact with each other makes it possible to reduce a strain that is caused in the radiator 50. As a result, the durability of the radiator 50 can be improved.

Fixing of Radiator

As described above, the clearances are provided between the frame 30 and the radiator 50. In other words, the radiator 50 is floating with respect to the frame 30. Therefore, it is not easy to fix the radiator 50 at a predetermined position inside the frame 30. This is because the state in which the radiator 50 is floating with respect to the frame 30 does not allow positioning of the radiator 50 to be easily performed. To address this, a total of four refrigerant inlets and refrigerant outlets are used to fix the radiator 50 to the frame 30. The fixing is achieved by means of through holes 32 formed in the frame 30, and pipe flanges 60.

Fixing of Radiator

The frame 30 has four through holes 32. The through holes 32 are formed at positions corresponding to the refrigerant inlet and outlet of the first radiator member 51 and the refrigerant inlet and outlet of the second radiator member 52, respectively. Each of the refrigerant inlets and the refrigerant outlets is disposed in a corresponding one of the through holes 32. The refrigerant inlets and the refrigerants outlet are each fixed to the through hole 32 via the pipe flange 60, whereby the radiator 50 is fixed to the frame 30.

Figure 3:
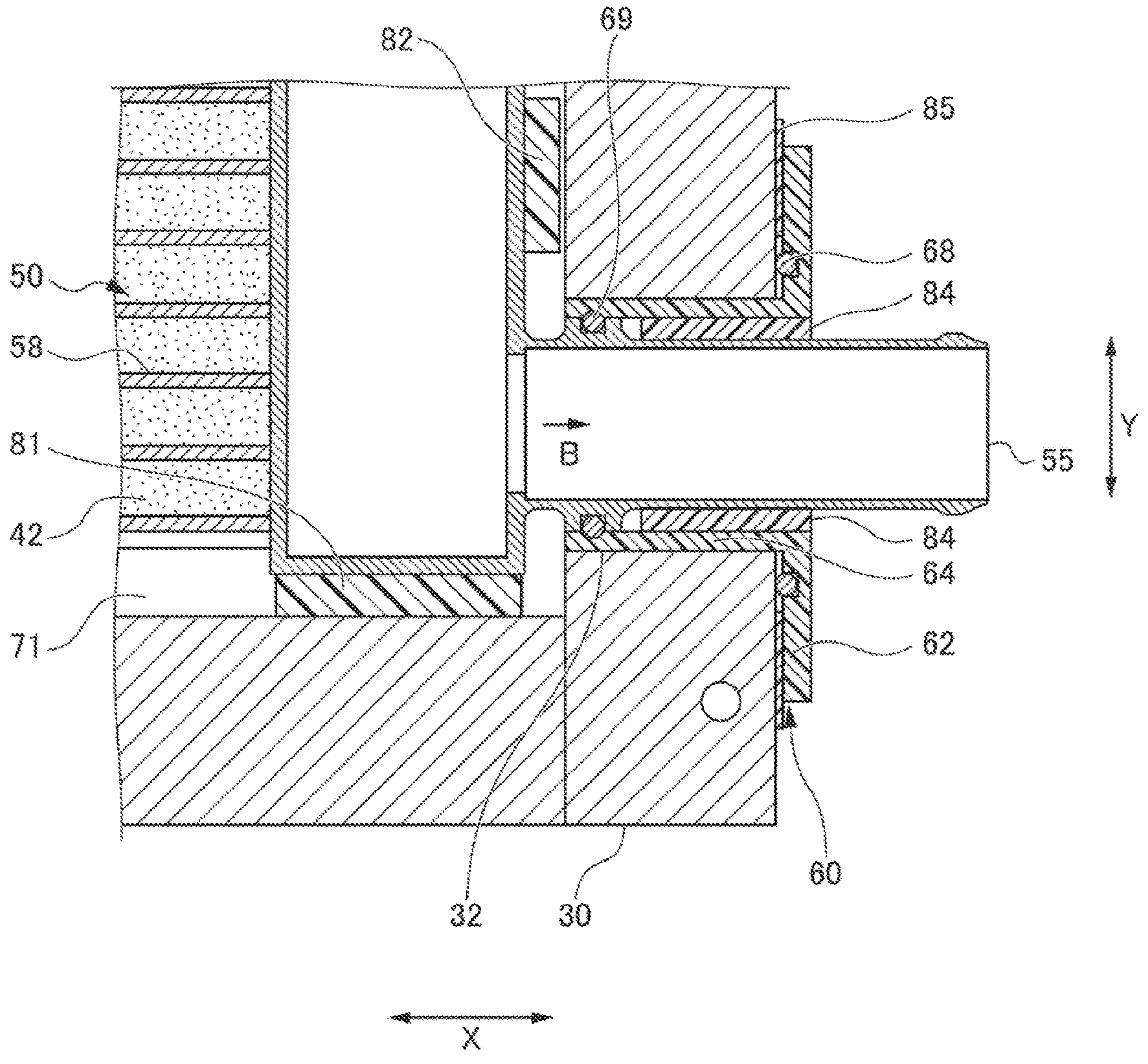
FIG. 3 is a diagram illustrating, on an enlarged scale, the portion marked with the rectangular box A in FIG. 2.

The fixing of the radiator 50 to the frame 30 will be specifically described with reference to FIG. 3. FIG. 3 is a diagram illustrating, on an enlarged scale, the portion marked with the rectangular box A in FIG. 2. That is, to describe how the radiator 50 is fixed by means of the through holes 32, FIG. 3 illustrates one of the four through holes 32. Specifically, FIG. 3 illustrates the second refrigerant inlet 55 that contributes to fixing to the frame 30. The direction indicated by the arrow B in FIG. 3 is a direction from the inside to the outside of the frame 30, i.e., an inside-to-outside direction B.

The second refrigerant inlet 55 is fixed in the through hole 32 via the pipe flange 60. More specifically, the second refrigerant inlet 55 penetrates the through hole 32. The pipe flange 60 and a heat insulator 84 are interposed between the second refrigerant inlet 55 and the through hole 32. The pipe flange 60 is fixed to the frame 30. In this way, the second refrigerant inlet 55 is fixed in the through hole 32 via the pipe flange 60. In the following, the aforementioned components will be described in order.

Refrigerant Inlet and Pipe Flange

The second refrigerant inlet 55 has a round tube shape, and the tube shape extends in the inside-to-outside direction B. On the other hand, the pipe flange 60 has a shape through which the second refrigerant inlet 55 can penetrate. The pipe flange 60 has a shape attachable to the frame 30.

Figure 4:
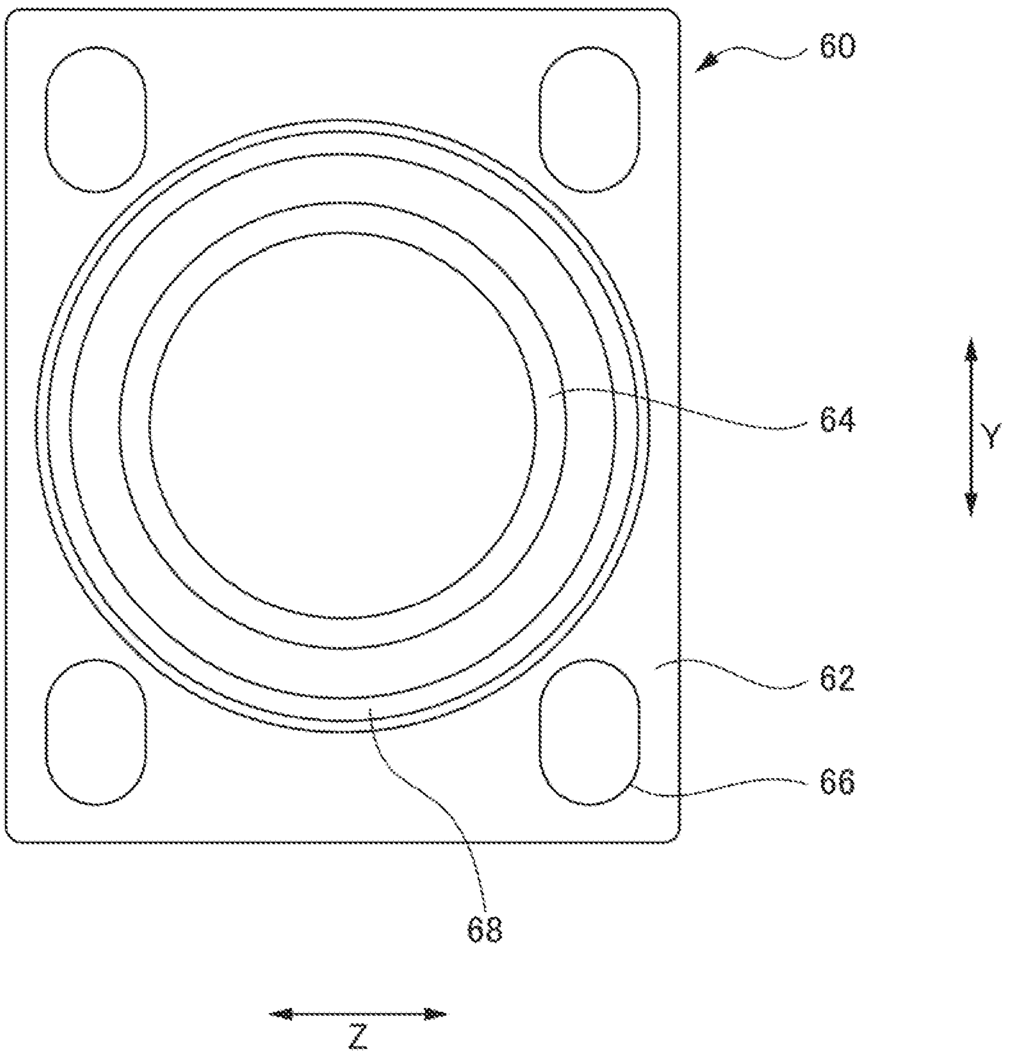
FIG. 4 is a diagram illustrating a pipe flange.

FIG. 4 is a diagram illustrating the pipe flange 60, when viewed in the inside-to-outside direction B shown in FIG. 3. The pipe flange 60 includes a base portion 62 and a pipe portion 64 extending in a direction orthogonal to the base portion 62. The base portion 62 is a portion to be mounted to the frame 30. The pipe portion 64 is a portion into which the second refrigerant inlet 55 is inserted.

The base portion 62 has mounting holes 66 which serve as screw holes when the base portion 62 is mounted to the frame 30. The base portion 62 has a generally quadrangular shape. A total of four mounting holes 66 are formed in the vicinities of the four corners of the quadrangular base portion 62 on a one-to-one basis. The mounting hole 66 includes a long hole or an enlarged hole. The long hole or the enlarged hole means an opening having an elongated circular shape.

In a state the pipe flange 60 has been inserted into the through hole 32, there is a gap between the inner wall of the through hole 32 and the outer periphery of the pipe portion 64. Therefore, the pipe flange 60 can be displaced in, for example, the height direction Y. As described above, the radiator 50 is floating with respect to the frame 30. Therefore, it is difficult to fixedly position the radiator 50 inside the frame 30. Furthermore, since the refrigerant inlets and the refrigerant outlets, which are a plurality of refrigerant flow paths, are arranged at different positions in the height direction, relative positional displacement in the height direction Y is likely to occur.

Acceptance of Positional Displacement

There is a gap between the pipe portion 64 of the pipe flange 60 and the through hole 32. Therefore, in the through hole 32, the pipe flange 60 is allowed to be displaced in position within the range of the gap.

The mounting holes 66 are long holes or elongated holes. Therefore, even when there is positional displacement between the pipe flange 60 and the frame 30, the fastening to the frame 30 can be achieved. That is, the pipe flange 60 can be fixed to the frame 30.

In the manner described above, the pipe flange 60 accepts the positional displacement of the radiator 50. In other words, the pipe flange 60 tolerates the positional displacement of the radiator 50.

Heat Insulator

In a state in which the second refrigerant inlet 55 has been inserted into the pipe portion 64, the heat insulator 84 is interposed between the outer periphery of the second refrigerant inlet 55 and the inner periphery of the pipe portion 64. The heat insulator 84 may have a cylindrical shape, for example. As a result, heat can be inhibited from being transferred from the second refrigerant inlet 55 to the pipe flange 60 and hence to the frame 30, thereby reducing heat loss.

A foam material 85 is disposed in at least part of a contact portion between the base portion 62 of the pipe flange 60 and the frame 30. This allows for heat insulation between the pipe flange 60 and the frame 30.

The materials for the heat insulator 84 and the foam material 85 are not particularly limited. For example, they may be made of foamed PTFE, like the holding members described above.

O-Rings

In the through hole 32, a second O-ring 69 is disposed between the second refrigerant inlet 55 and the pipe portion 64 of the pipe flange 60. A first O-ring 68 is disposed between the base portion 62 of the pipe flange 60 and the frame 30. As a result, airtightness can be ensured between the inside and outside of the frame 30.

In the carbon dioxide removal apparatus 1, the inside of the frame 30 is decompressed when carbon dioxide is to be desorbed from the adsorbent 42, for example. The carbon dioxide removal apparatus 1 of the present embodiment is provided with the first O-rings 68 and the second O-rings 69. Therefore, the internal pressure of the frame 30 can be easily maintained at a desired pressure.

The fixing of the refrigerant inlet in the through hole 32 has been described above by taking the second refrigerant inlet 55 as an example. The description above also applies to the other three through holes 32.

The radiator 50 is fixed to the frame 30 by means of a total of four refrigerant inlets and outlets fixed in the through holes 32, while floating inside the frame 30. The refrigerant inlets and outlets, which are the plurality of refrigerant flow paths, are preferably distributed one side and the other side in the lateral width direction X. In the present embodiment, the first refrigerant inlet 53 and the first refrigerant outlet 54 of the first radiator member 51 are arranged on one side of the radiator 50 in the lateral width direction X, and the second refrigerant inlet 55 and the second refrigerant outlet 56 of the second radiator member 52 are arranged on the other side of the radiator 50 in the lateral width direction X. Thus, distributing the refrigerant inlets and outlets, which are the plurality of refrigerant flow paths, such that one side and the other side in the lateral width direction X are each provided with two of the refrigerant flow paths makes it possible to more stably fix the radiator 50 to the frame 30.

Filling of Adsorbent

With reference to FIG. 3, it will be described how the adsorbent 42 is filled. As described above, the adsorbent 42 is filled between the fins 58 of the radiator 50. The plurality of fins 58 are arranged at predetermined intervals in the height direction Y. The spaces between the fins 58 are filled with the adsorbent 42. In this way, the adsorption-desorption part 40 is provided with the adsorbent 42.

Air Guides

Figure 5:
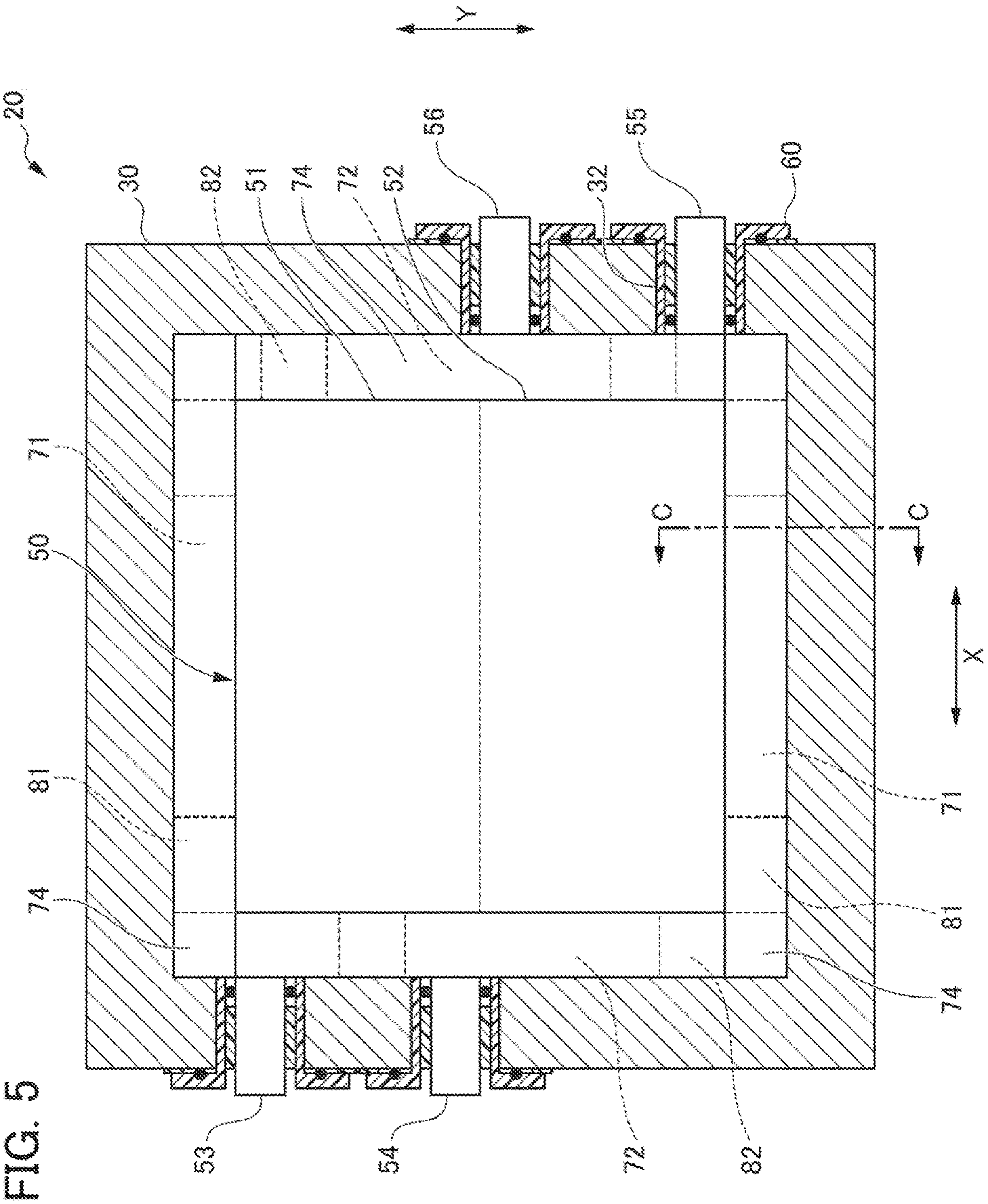
FIG. 5 is a diagram schematically illustrating a configuration of a carbon dioxide adsorption module of the present invention in which air guides are arranged.

Air guides will be described with reference to FIGS. 5 and 6. FIG. 5 is a diagram schematically illustrating the configuration of the carbon dioxide adsorption module 20 of the present invention in which the air guides are provided. FIG. 5 corresponds to FIG. 2 in which the air guides are disposed adjacent to the first clearances 71 and the second clearances 72. The air guides include a first air guide 74 and a second air guide 76, as will be described later.

The air guide is a member disposed adjacent to the first clearance 71 and/or the second clearance 72 in order to close at least one of the first clearance 71 or the second clearance 72. Here, closing the clearance means a state in which the first clearance 71 or the second clearance 72 is covered in a planar view of the carbon dioxide adsorption module 20 in the X-Y plane. Therefore, the air guide can have a shape corresponding to the first clearance 71 or the second clearance 72.

In the example illustrated in FIG. 5, in a planar view of the carbon dioxide adsorption module 20 in the X-Y plane, the first clearance 71 and the second clearance 72 has a rectangular shape. Therefore, each air guide also has a rectangular shape in the planar view in the X-Y plane. The shape of each air guide is not particularly limited as long as the air guide can close the clearance, and the air guide may have a shape other than a rectangular shape. In the following, the air guides will be described in detail with reference to FIG. 6. FIG. 6 is a cross-sectional view taken along line C-C of FIG. 5.

Figure 6:
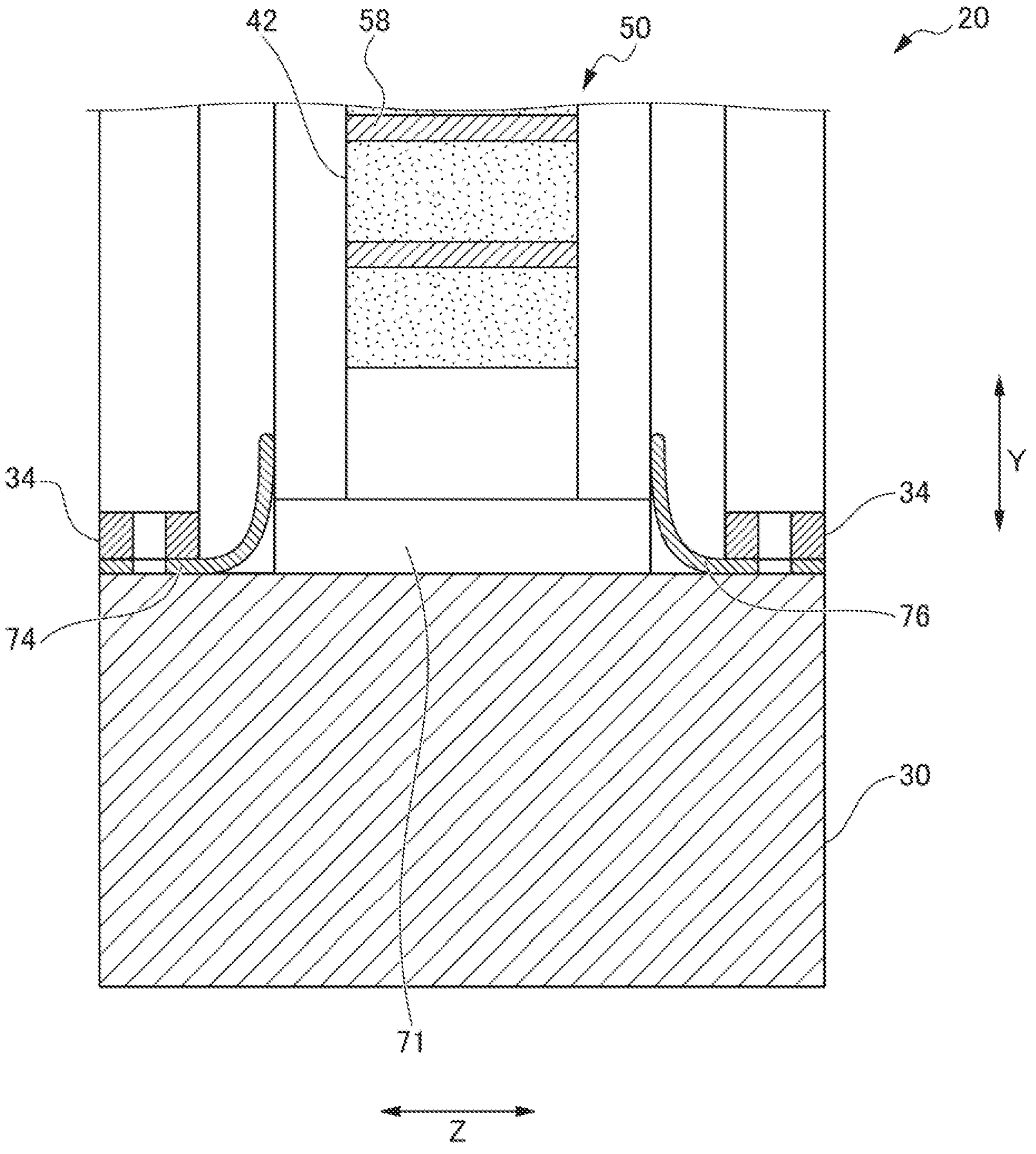
FIG. 6 is a cross-sectional view taken along line C-C of FIG. 5.

As shown in FIG. 6, the first air guide 74 and the second air guide 76 are disposed adjacent to the first clearance 71. The first air guide 74 extends from one side in the depth direction Z of the frame 30 toward the radiator 50. On the other hand, the second air guide 76 extends from the other side in the depth direction Z of the frame 30 toward the radiator 50. At least one of the first air guide 74 or the second air guide 76 increases in a degree of contact with the adsorption-desorption part 40 when the inside of the frame 30 is decompressed. That is, the degree of contact between at least one of the first air guide 74 or the second air guide 76 and the adsorption-desorption part 40 increases.

FIG. 5 illustrates only the first air guides 74, while omitting the second air guides 76. For the first clearances 71 and the second clearances 72, the opposite sides in the Z direction are each provided with the first air guide 74 or the second air guide 76. That is, each clearance is sandwiched between the air guides from the opposite sides in the Z direction. This configuration makes it possible to more reliably inhibit air from passing through each clearance in the Z direction.

Plates 34 for fixing the air guides 74 and 76 to the frame 30 are disposed on both sides of the frame 30 in the depth direction Z of the radiator 50. The first air guides 74 and the second air guides 76 are each sandwiched between the plate 34 and the frame 30. Thus, the air guides are fixed to the frame 30. Each air guide is a sheet-like member with flexibility and has a fixed end that is fixed to the frame 30 and a free end that extends toward the adsorption-desorption part 40.

The first clearance 71 is closed by the air guides at both sides in the depth direction Z. Each air guide is curved. Specifically, each air guide is curved in such a direction that its outer periphery faces the first clearance 71. The air guides curved in such a direction can smoothly guides air to the radiator 50.

The air guides are each formed of a heat insulating material. This makes it possible to inhibit the heat of the radiator 50 from being transferred to the frame 30 via the air guides. As a result, a decrease in thermal efficiency can be suppressed.

The air guides are each made of a flexible material. Therefore, the air guides can be easily curved as described above.

The material for forming the air guide is preferably, but not limited to, a foam material. In the case of the air guides formed of a foam material, air bubbles contained in the air guides can reduce the heat transfer from the radiator 50 to the frame 30 through the air guides. Furthermore, the form material imparts flexibility to the air guides even if the material is chemically stable.

Among foam materials, a fine foam material is preferred as the material for forming the air guides. As described above, in the desorption step, the inside of the frame 30 is decompressed. In the case where the air guides are formed of a fine foam material containing small air bubbles, improper deformation of the air guides due to repetition of the decompression step can be inhibited.

The material for forming the air guides is preferably PTFE (polytetrafluoroethylene). That is, it is preferable to form the air guides of foamed PTFE. Fluoroplastics such as PTFE have high resistance to amine compounds that are used as adsorbents.

With reference to FIG. 6, the air guides disposed adjacent to the first clearance 71 have been described. The air guides may also be disposed adjacent to the second clearance 72. Furthermore, the air guides can be provided adjacent to a total of four clearances, i.e., two first clearances 71 in the height direction Y and two second clearances 72 in the lateral width direction X. In the case of proving the air guides adjacent to all the four clearances, air is not allowed to pass through the clearances, but is caused to pass through the radiator 50, whereby carbon dioxide is adsorbed from air with high efficiency.

That is, in the adsorption step, it is necessary to cause air to pass through the adsorbent 42. Here, when there is a clearance between the frame 30 and the radiator 50, part of air from the intake part 22 may pass through the clearance without passing through the adsorbent 42. Rather, in terms of conductance of the gas flow path, a large amount of air may pass through the clearance. In this case, the adsorption efficiency of carbon dioxide decreases.

In the case where the air guides are arranged adjacent to the clearance, the air is blocked and prevented from passing through the clearance. In other words, a major part of the air is caused to pass through the adsorbent 42. Therefore, the efficiency of adsorption of carbon dioxide from air can be increased.

Specifically, in the carbon dioxide adsorption step, when air to be subjected to the adsorption passes through the radiator 50 in the depth direction Z inside the frame 30, a major part of the air can be guided to the radiator 50. In other words, the air flowing in the frame 30 can be guided to the radiator 50 without wasting the air, while ensuring the clearances, i.e., air layers, between the frame 30 and the radiator 50. Thus, the adsorption time can be shortened. In addition, energy required in the adsorption step can be reduced. Since the effect of vacuum insulation of the clearances between the frame 30 and the radiator 50 can also be ensured in the carbon dioxide desorption step, heat loss due to heat transfer from the radiator 50 to the frame 30 can be effectively reduced.

The arrangement of the air guides is not particularly limited as long as the air guides close at least a portion of the clearance. In the above-described case where all the four clearances are closed, for example, the air guides can be arranged as follows.

The air guides for closing the first clearances 71 are placed. At this time, the air guides are arranged so as to close the first clearances 71 on the upper side and the lower side in the height direction Y. Thereafter, the air guides are placed so as to close the second clearances 72, which have not been closed. At this time, the air guides are arranged so as to close the two clearances on both sides in the lateral width direction X. Arranging the air guides in this manner makes it possible to inhibit air from passing through each of the four clearances. The air guides preferably include the first air guides 74 and the second air guides 76 that sandwich the radiator 50, but only the first air guides 74 or the second air guides 76 may be provided. In particular, the air guides are preferably provided on an intake side of the adsorption-desorption part 40 including the radiator 50. With this configuration, during the adsorption step, the free end of each of the flexible air guides moves in the direction in which the free end comes into contact with the adsorption-desorption part 40 due to the effect of flow of air, whereby the air flowing in the frame 30 can be effectively guided to the radiator 50.

It should be noted that the present invention is not limited to the embodiment described above, and various changes, modifications and combination thereof may be made to the present invention.

EXPLANATION OF REFERENCE NUMERALS

1: Carbon dioxide removal apparatus
14: Vacuum pump
16: Carbon dioxide sensor
18: Flowmeter
20: Carbon dioxide adsorption module
22: Intake part
24: Discharge part
30: Frame
32: Through hole
34: Plate
40: Adsorption-desorption part
42: Adsorbent
50: Heat exchanger (radiator, adsorbent holding member)
51: First heat exchanger
52: Second heat exchanger
53: First refrigerant inlet
54: First refrigerant outlet
55: Second refrigerant inlet
56: Second refrigerant outlet
58: Fin
60: Pipe Flange
62: Base portion
64: Pipe portion
66: Mounting hole
68: First O-ring
69: Second O-ring
71: First clearance
72: Second clearance
74: First air guide
76: Second air guide
81: First holding member
82: Second holding member
84: Heat insulator
85: Foam material
91: First valve
92: Second valve
94: Third valve

What is claimed is:

1. A carbon dioxide removal apparatus comprising:
a frame; and
an adsorption-desorption part supported by the frame, wherein
a clearance is provided between the frame and the adsorption-desorption part, and
an air guide having flexibility is provided adjacent to the clearance, wherein
the air guide is a sheet-like member,
the air guide has a free end that extends toward the adsorption-desorption part,
the free end moves, due to the flow of air, in a direction in which the free end comes into contact with the adsorption-desorption part.

2. The carbon dioxide removal apparatus according to claim 1, wherein
the adsorption-desorption part is partially fixed to the frame via a heat insulating holding member.

3. The carbon dioxide removal apparatus according to claim 1, wherein the adsorption-desorption part comprises a heat exchanger, the heat exchanger includes a refrigerant inlet and a refrigerant outlet, the frame has a through hole formed therein, the refrigerant inlet or the refrigerant outlet is disposed in the through hole, a pipe flange is interposed between an inner wall of the through hole and the refrigerant inlet or the refrigerant outlet, and a heat insulator is interposed between the pipe flange and the refrigerant inlet or the refrigerant outlet.

4. The carbon dioxide removal apparatus according to claim 3, wherein a heat insulator is disposed in at least part of a portion between the frame and the pipe flange.

5. The carbon dioxide removal apparatus according to claim 3, wherein a gap is provided between the frame and the pipe flange in the through hole, the pipe flange has a mounting hole via which the pipe flange is fixed to the frame, and the mounting hole includes an opening having an elongated circular shape.

6. The carbon dioxide removal apparatus according to claim 1, wherein in a state in which an inside of the frame is decompressed, a degree of contact increases between the air guide and the adsorption-desorption part.

7. The carbon dioxide removal apparatus according to claim 1, wherein the air guide is a foam material.

* * * * *